April 18, 1967     B. T. WILLMAN ETAL     3,314,481

DOWNHOLE WATER FILTER

Filed Aug. 7, 1964

Bertram T. Willman
Carl T. Hester    INVENTORS.

BY *Gary C. Honeycutt*
              ATTORNEY

United States Patent Office 3,314,481
Patented Apr. 18, 1967

3,314,481
DOWNHOLE WATER FILTER
Bertram T. Willman, Tulsa, Okla., and Carl T. Hester, Corpus Christi, Tex., assignors, by mesne assignments, to Esso Production Research Company, Houston, Tex., a corporation of Delaware
Filed Aug. 7, 1964, Ser. No. 388,100
8 Claims. (Cl. 166—205)

This invention relates to the recovery of petroleum from porous subterranean reservoirs, and more particularly to methods for oil recovery which involve the injection of a fluid into such reservoirs by means of an input well. A downhole filtration device is provided which is adapted for installation or replacement without the need for pulling the well tubing, and without the usual wire line workover operation.

In a waterflood project, filtration of the injected water is frequently necessary because a plugging of the formation would otherwise occur due to the entrainment of solids in the injection water. Well head cartridge filters are sometimes employed, but they have been found to provide only a partial solution to the problem inasmuch as they do not protect the formation from corrosion products, mill scale, precipitated solids and the like which may be formed or entrained in the water between the well head and the formation. In fact, the tubing string is sometimes longer than the surface pipe, wherein the formation of solids gives rise to the need for a well head filter.

In accordance with the present invention a filter assembly is provided which is capable of being lubricated into the well and pumped down the tubing by the pressure of injected water. The filter then seats at the lower end of the tubing string. During continued injection, the water or other injected fluid passes through the filter where solids are removed, causing the filter eventually to become loaded or plugged. The well is then backflowed, whereby formation pressure forces the filter assembly back up the hole so that it can be retrieved at the well head without the use of a wire line or other conventional workover procedure. The filter is then disassembled, equipped with a fresh filter cartridge, and is re-lubricated into the hole and re-seated at the lower end of the well tubing.

The filter assembly of the invention includes a perforated central tubular member on which the filter element or cartridge is to be mounted. At the lower end of the central tubular member a check valve is provided which permits injection flow, but seals upon backflowing the well, whereby formation pressure forces the assembly upward to the well head where it is recovered.

In addition, the assembly includes an outer cylindrical shield on which are mounted upper and lower sliding fluid seals which fit against the inside diameter of the tubing string. The upper portion of the shield member is provided with one or more small perforations for the purpose of equalizing pressure on opposite sides thereof. The shield serves the additional purpose of preventing accumulated solids from jamming the filter down hole and thereby preventing its retrieval. Moreover, the shield is a container for the accumulated solids thereby preventing the loss of entrained solids during the removal of the filter assembly from bottom hole.

In a preferred embodiment the upper end of the filter element is capped with a cylindrical member which extends to a level substantially below the upper end of the shield, in order to prevent a possible buildup of solids to the level of the upper seal. An additional feature is the provision of a frangible burst plate just below the check valve, which assists in forcing the filter assembly downhole, and is then ruptured by fluid pressure after the assembly is firmly seated downhole. It would be possible to omit the frangible plate, and instead to provide the check valve with an injection flow resistance sufficient to provide the necessary pressure drop in pumping the filter downhole. However, once the filter is seated, such a pressure drop would be very wasteful of injection power.

Figure 1:
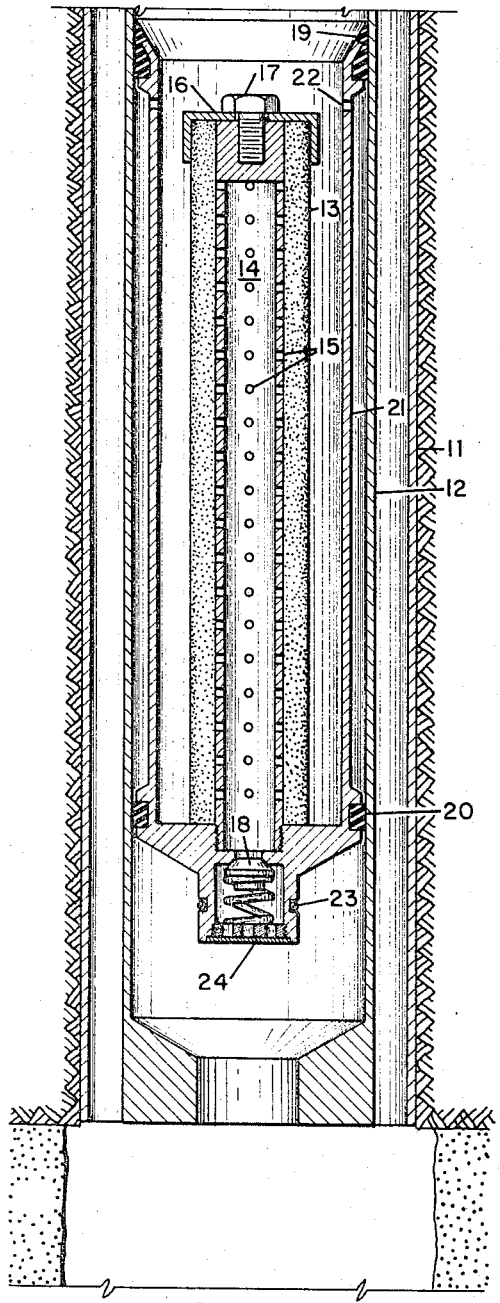
FIGURE 1 is a longitudinal cross-section of the filtration assembly located a short distance above the lower end of the tubing string.

In FIGURE 1, an injection well completion is shown which includes casing 11 and tubing 12. The filtration device is shown inside tubing 12, near the end of a trip down hole. The assembly includes cylindrical filter element 13 mounted on a central tubular element 14 having perforations 15 therein. The filter element is replaceable and is held in place by cap 16 and bolt 17. Check valve 18 is provided within a lower portion of the assembly, which permits injection flow during the time the filter is in use, and thereafter seats upon backflowing the well, whereby formation pressure forces the assembly up the tubing string where it is recovered at the well head.

Sliding annular seals 19 and 20 are provided at upper and lower levels, respectively, of cylindrical shield member 21. Shield 21 extends substantially above the upper end of filter element 13. In that portion of the shield which extends above the filter element, small perforations 22 are provided in the shield member as a means of equalizing pressure on opposite sides of the shield member. In operation, no substantial flow of injection fluid can pass through these perforations because of annular seal 20 and O-ring seal 23. As pointed out above, shield 21 functions as a container for accumulated filtration solids, in order to prevent such solids from jamming the filter down-hole, thereby preventing its retrieval. Frangible plate 24 remains intact until the assembly is seated at bottomhole.

Figure 2:
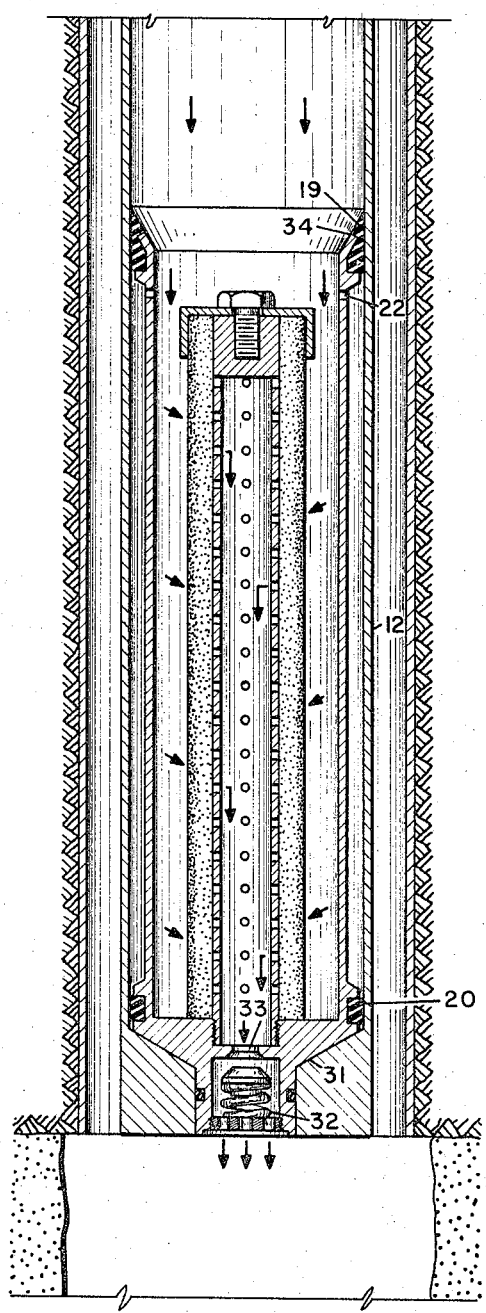
FIGURE 2 is a longitudinal cross-section of the assembly located in its operative position, seated at the lower end of the tubing.

In FIGURE 2 the filtration device is shown in its operative position, seated upon shoulder 31 near the lower end of tubing 12. Frangible plate 24, built to withstand a pressure drop sufficiently great to transport the device downhole, is now ruptured by a sharp increase in the pressure drop acting thereupon. Rupture of the plate is accompanied simultaneously by the depression of check valve spring 32, which opens orifice 33 to normal injection flow.

When continued injection has caused the filter to plug, as indicated by a drop in injectivity, injection is terminated thereby permitting the check valve to close. The tubing is then backflowed at the surface, whereby formation pressure forces the filter assembly upward through the tubing, where it is retrieved at the well head without the use of a wire line or other workover procedure. During the upward trip of the device, any adherent solids which may have accumulated along the inside of the tubing, such as corrosion products, mill scale and precipitated solids, will be scraped loose by upper lip 34 of seal 19. These additional solids collect in the upper level of the annular space provided for the normal collection of filtration solids. Thus, it is essential to provide a substantial interval between the level of the uppermost perforations 15 and perforations 22, since this is the space in which scrapings collect during the upward trip through the tubing.

It is also significant that lower seal 20 is the only seal which functions to withstand the pressure drop required to lift the device during its upward trip. Upper seal 19 cannot be relied upon for this purpose since ports 22 would permit fluids to bypass the seal. O-ring 23, of course, has a much smaller diameter than the inside diameter of the tubing, and therefore does not assist the lift operation.

Commercially available filters, having a pore size in the range of 25 to 75 microns are generally suitable for use in accordance with the present invention, although filters having a pore size outside this range may be used if desired. Cartridge filters having an outside diameter of 2⅞ inches, for example, are suitable for large diameter tubing. Smaller diameter filters are necessary for smaller tubing. Since two 25-micron filters measuring 2⅞ inches by 9¾ inches, for example, will pass 500 b.p.d. with a pressure drop in the range of 2 to 40 p.s.i., the filter assembly of the invention need not be excessive in length. A 10 foot assembly, for example, assuming 1.5 inch cartridges are used, will pass 1250 b.p.d. of water within the normal range of pressure drop conveniently provided at bottom-hole.

In the event a large amount of solids is entrained in the flood water, a well head filter may also be used in order to minimize the frequency with which the downhole filter must be changed. In such a combination, the assembly of the present invention would filter only the corrosive products, mill scale and precipitating solids which become entrained in the water during flow through the tubing alone.

What is claimed is:

1. A downhole filter assembly comprising a central perforated tubular member, a check valve below the perforated interval of said tubular member, a cylindrical filter element surrounding the perforated interval of said inner tubular member, an outer cylindrical shield substantially concentric with said inner tubular member, said shield being substantially imperforate opposite the perforated interval of said inner tubular member, and slidable fluid seal means mounted on the outer periphery of said shield member.

2. A pumpable device for retrievably installing a filter element at the bottom of an injection well which comprises: an outer cylindrical member, upper and lower annular fluid seals mounted on the outer periphery of said cylindrical member, and adapted to slidably engage the wall of said well, a perforated inner tubular member for mounting said filter element, and means for limiting fluid flow through said assembly to that direction which corresponds to the injection of fluids from the surface of the earth through said borehole and into the earth.

3. A pumpable device for retrievably installing a filter element within a tubular conduit comprising: a central perforated member for mounting the filter element, an outer cylindrical shield substantially surrounding said mounting member, said shield being substantially imperforate opposite the perforated interval of said central perforated member, slidable fluid seal means mounted on the outer periphery of said shield, and check valve means for limiting fluid flow through said filter element to one direction only.

4. A device as defined in claim 3 wherein said slidable fluid seal means comprises: upper and lower annular fluid seals, the upper seal having a configuration which extends above the upper end of said shield, and which upon retrieval directs scrapings from said conduit into the annular space between said shield and said means for mounting said filter element.

5. A device as defined by claim 3 wherein said shield is vented at a level substantially above the uppermost perforations of said tubular means for mounting said filter element.

6. A downhole filter assembly comprising a central perforated tubular member, a check valve within a lower portion of said tubular member, a cylindrical filter element surrounding the perforated interval of said inner tubular member, an outer cylindrical shield substantially concentric with said inner tubular member, upper and lower slidable fluid seals mounted on the outer periphery of said shield, means enclosing the annulus between said central tubular member and said cylindrical shield member at the lower end of said assembly, and a frangible burst plate closing said central tubular member at a level below the perforated interval thereof.

7. A pumpable device for mounting a tubular filter element within the tubing of an injection well which comprises: an outer cylindrical shield having a diameter slightly less than that of said tubing, upper and lower slidable fluid seals mounted on the outer periphery of said shield and adapted to engage the inside of said tubing, said upper fluid seal having an outwardly flared lip which extends above the upper end of said shield, a central perforated tubular member for mounting said filter element, said cylindrical shield having at least one port therein at a level intermediate said upper and lower seals and at a level substantially above the uppermost perforations of said central tubular member, an end piece enclosing the annular space between the lower ends of said central tubular member and said cylindrical shield, said end piece having a downwardly facing annular shoulder adapted to seat upon a corresponding upwardly facing shoulder provided therefor within the lower portion of the tubing, a check valve within said end piece for permitting injection flow within said well to the substantial exclusion of production flow, and a frangible burst plate covering the lower outlet end of said device.

8. An injection well assembly which comprises a tubing string suspended within said well, an annular shoulder within said tubing string near the lower end thereof, and a filter assembly within said tubing seated upon said annular shoulder, said filter assembly comprising an outer cylindrical shield, fluid seal means mounted on the outer circumference of said shield, a filter element mounted inside said shield member, and a check valve within said filter assembly for permitting injection flow to the substantial exclusion of production flow.

References Cited by the Examiner

UNITED STATES PATENTS

| Re. 14,756 | 11/1919 | Scott | 166—157 X |
|---|---|---|---|
| 1,839,044 | 12/1931 | Minyard | 166—157 X |
| 2,167,191 | 7/1939 | Vietti et al. | 166—205 X |
| 2,335,558 | 11/1943 | Young | 166—228 |
| 2,793,752 | 5/1957 | Jay | 210—130 |
| 2,833,354 | 5/1958 | Sailers | 166—205 |

CHARLES E. O'CONNELL, *Primary Examiner.*

D. H. BROWN, *Assistant Examiner.*